United States Patent [19]

Takeda et al.

[11] Patent Number: 4,798,087
[45] Date of Patent: Jan. 17, 1989

[54] INCLINATION DETECTOR

[75] Inventors: Tamio Takeda, Tama; Minoru Take, Iwaki, both of Japan

[73] Assignee: Kabushiki Kaisha Kenwood, Japan

[21] Appl. No.: 87,192

[22] Filed: Aug. 20, 1987

[30] Foreign Application Priority Data

Aug. 22, 1986 [JP] Japan .................. 61-127090[U]

[51] Int. Cl.[4] .............................................. G01C 9/06
[52] U.S. Cl. ................................. 73/649; 340/566; 33/366
[58] Field of Search ............ 250/231 R, 231 SE; 356/138, 149, 250; 33/283, 366, 391, 402; 73/432.1, 649, 652, 655, 657, 658, 660; 340/566

[56] References Cited

U.S. PATENT DOCUMENTS

| 2,486,697 | 11/1949 | White | 33/402 |
| 3,204,233 | 8/1965 | Olliff | 33/366 |
| 3,233,235 | 2/1966 | Wright | 33/402 |
| 4,492,029 | 1/1985 | Tanaka et al. | 33/391 |
| 4,571,844 | 2/1986 | Komasaku et al. | 33/366 |
| 4,724,312 | 2/1988 | Snaper | 250/214 B |
| 4,728,788 | 3/1988 | Myers et al. | 250/231 SE |

FOREIGN PATENT DOCUMENTS 0142411 11/1981 Japan ..................... 356/138

*Primary Examiner*—Stewart J. Levy
*Assistant Examiner*—Robert R. Raevis
*Attorney, Agent, or Firm*—Gerald J. Ferguson, Jr.

[57] ABSTRACT

An inclination detector is constructed such that a displacement detection plate of generally fan-shape is pivotally supported at its fan-pivot, a plurality of slits are formed in the displacement detection plate concentrically of the fan-pivot at predetermined intervals, and a light emitting element and a light sensitive element constituting a photocoupler are disposed on opposite sides of the displacement detection plate with the slits interposed therebetween, whereby when a slit is caused to move due to a vibration or slant and traverse the optical path of the photocoupler, a displacement of the slit due to the vibration or slant is outputted from the light sensitive element.

4 Claims, 3 Drawing Sheets

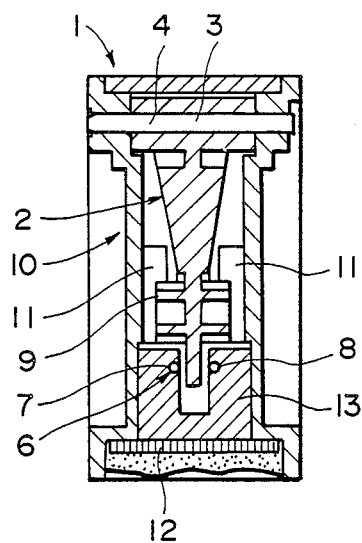
F I G. 3
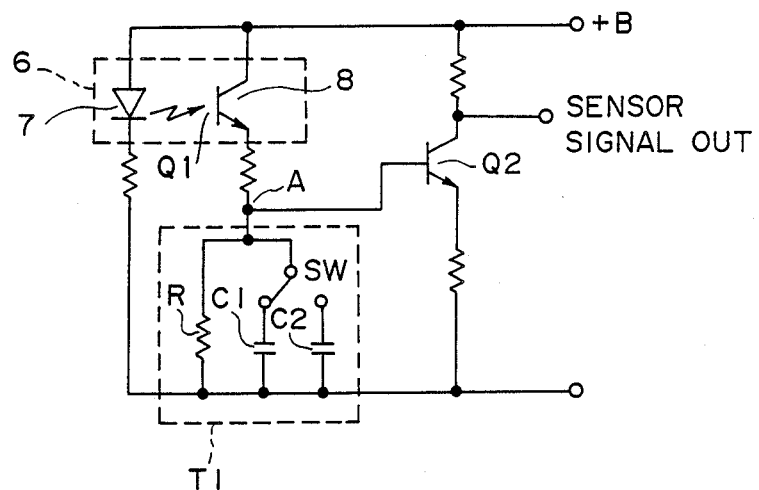
F I G. 4

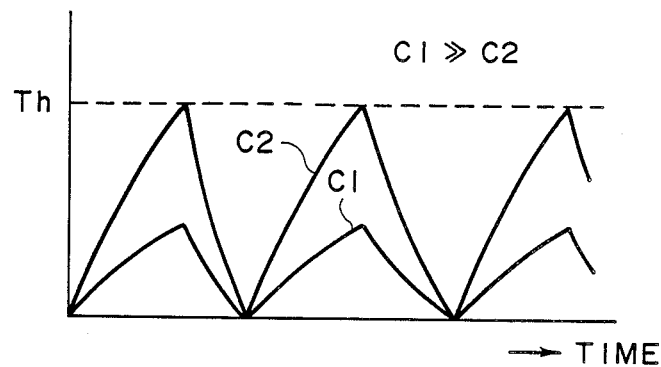
F I G. 5
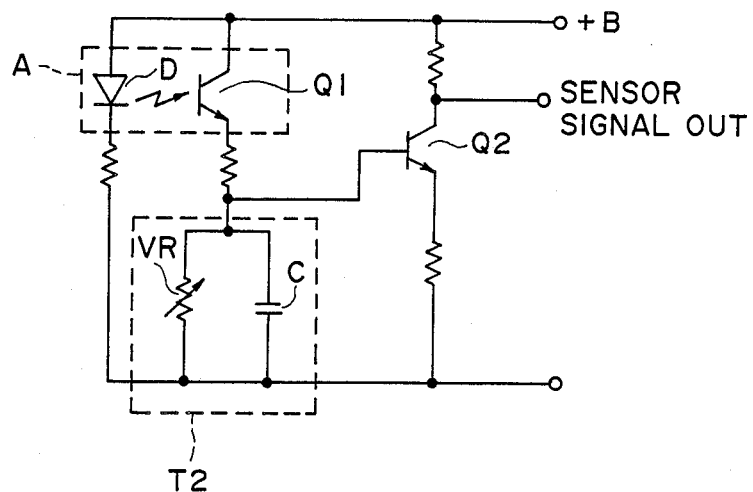
F I G. 6

INCLINATION DETECTOR

BACKGROUND OF THE INVENTION

1. Field of the Invention

The present invention relates to an inclination detector suitable for use with an automobile burglar-proof apparatus for detecting a change in position or posture of the automobile, and more particularly to an inclination detector operable without any severe mounting condition and capable of adjusting a sensitivity or other settings.

2. Description of the Prior Art

Various vibration sensors are known which are used as inclination detectors of automobile burglar-proof apparatus for detecting a change in position of the automobile. An example of such an inclination sensor is a mercury type sensor shown in FIG. 1. If a horizontal mount plane 21 vibrates or slants, mercury 24 sealed in the envelope 23 of the sensor 22 touches contacts 25 and 26 to output a detection signal.

A conventional mercury type sensor as above, however, should be mounted perfectly horizontal. If not, the on/off of the contacts 25 and 26 becomes incorrect.

Depending upon the type of automobile, the strength of suspensions and the weight of the automobile differ and hence the vibration mode. Therefore, in order to use a vibration detector properly, it is desirable to add a detection sensitivity changeover circuit thereto.

SUMMARY OF THE INVENTION

It is an object of the present invention to eliminate the problems associated with a conventional inclination sensor and provide an inclination detector operable without any severe mounting condition and capable of adjusting a sensitivity or other settings.

According to an aspect of the present invention, an inclination detector is constructed such that a displacement detection plate of generally fan-shape is pivotally supported at its fan-pivot, a plurality of slits are formed in the displacement detection plate concentrically of the fan-pivot at predetermined intervals, and a light emitting element and a light sensitive element constituting a photocoupler are disposed on opposite sides of the displacement detection plate with the slits interposed therebetween, whereby when a slit is caused to move due to a vibration or slant and traverse the optical path of the photocoupler, a displacement of the slit due to the vibration or slant is outputted from the light sensitive element.

According to another aspect of the present invention, an inclination detection sensitivity changeover circuit for an inclination detector is constructed such that a detection pulse signal from the inclination detector is inputted to a filter whose cut-off frequencies are changed by selecting a time constant to make the detection pulse signal have frequency characteristics corresponding to the selected time constant, whereby the sensitivity of detecting a slant or vibration applied to the inclination detector is made selectable.

BRIEF DESCRIPTION OF THE DRAWINGS

FIGS. 2 and 3 show the structure of an embodiment of an inclination detector according to the present invention;

FIG. 4 is a circuit diagram showing an example of an inclination detection sensitivity changeover circuit according to the present invention;

FIG. 5 shows the waveforms of detection pulses obtained by the circuit shown in FIG. 4; and FIG. 6 is a circuit diagram showing another example of an inclination detection sensitivity changeover circuit according to the present invention.

DESCRIPTION OF THE PREFERRED EMBODIMENTS

Figure 1:
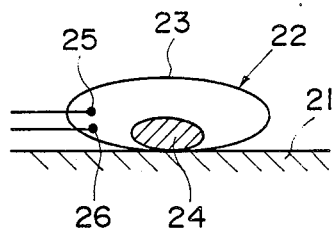
FIG. 1 shows an example of a conventional inclination detector.
Figure 2:
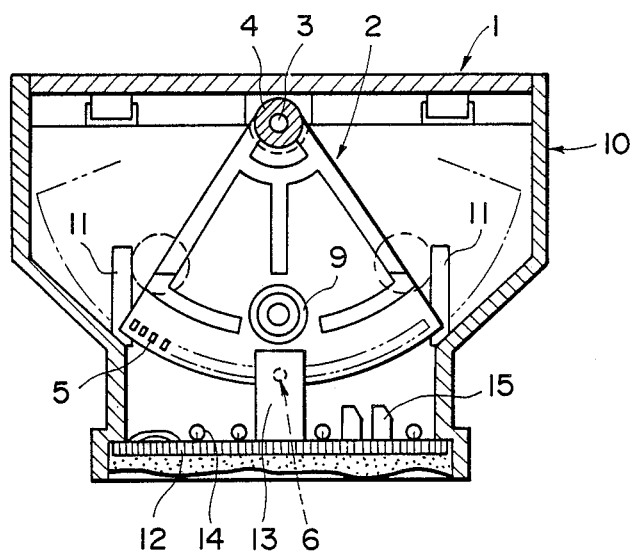

Referring to FIGS. 2 and 3, an inclination detector generally indicated by reference number 1 is constructed such that a displacement detection plate 2 of generally fan-shape is pivotally supported at its fan-pivot or point 3 by a shaft 4, a plurality of slits 5 are formed in the displacement detection plate 2 concentrically of the fan-pivot 3 at predetermined intervals, and a light emitting element 7 and a light sensitive element 8 constituting a photocoupler 6 are disposed on opposite sides of the displacement detection plate 2 with the slits 5 interposed therebetween, whereby when a slit 5 is caused to move due to a vibration or slant and traverse the optical path of the photocoupler 6, a displacement of the slit 5 due to the vibration or slant is outputted from the light sensitive element 8.

A weight 9 for restricting the swing width of the displacement detection plate 2 is projected from the plate 2 at the position lower than the fan-pivot 3 in the vertical direction. The weight 9 gives a gravitational inertia to the plate 2. The weight 9 in combination with guide members 11, 11 formed along the swing path of the plate restricts the swing width of the plate 2.

The displacement detection plate 2 whose right and left sides are symmetrical in shape depends from a frame 10. As the weight 9 projecting from the opposite sides of the plate 2 is swung to the right and left sides as shown by broken lines in FIG. 2, it strikes with the guide members 11, 11 projecting from the frame 10 to thereby restrict the swing width of the plate 2. As shown in FIGS. 2 and 3, a board 12 is provided on the bottom of the frame 12, on which board a bifurcated member 13 is mounted. An LED as the light emitting element 7 and a phototransistor as the light sensitive element 8 are mounted on the bifurcated member 13. Electronic components 14, 15 are mounted on the board 13.

According to the inclination detector of this invention, if the mount plane of the inclination detector slants or vibrates, the displacement detection plate swings about the shaft and the slit thereof traverses the optical path of the photocoupler, to thereby output a displacement of the slit from the light sensitive element. Thus, a response to vibration is very quick and a correct detection signal can be obtained. Even if the mount plane is not horizontal and slightly inclined at first, the initial setting of using such an inclined plane as a reference by a microcomputer circuit control allows a correct vibration detection, to thereby obviate a severe mounting condition. Further, since a detected output signal is a pulse, an alarm for example may be given when a predetermined number of pulses are detected. In addition, the detection capability of the inclination detector can be adjusted arbitrarily by forming slits at a proper interval.

Use of the weight allows an improvement on the moment of inertia of the displacement detection plate. Further, use of guide members along the swing path of the plate allows the swing width of the displacement plate to be restricted.

It is possible to adjust the sensitivity of the vibration detector 1 constructed as shown in FIGS. 2 and 3, by coupling an output from the photocoupler 6 to a detection sensitivity changeover circuit shown in FIG. 4.

In FIG. 4, a detected pulse signal from a light sensitive element Q1 is inputted to a filter T1 made of a low-pass filter whose cut-off frequencies are changed by selecting a time constant defined by a capacitor C1 and a resistor R or by a capacitor C2 and the resistor R, using a switch SW. Assuming that C1 is much larger than C2, the frequency characteristics at point A in FIG. 4 are shown in FIG. 5. If the capacitor C1 is selected by the switch SW, a detected pulse signal having a waveform indicated by C1 in FIG. 5 is inputted to the base of a switching transistor Q2. In this case, the detection sensitivity to a slant or vibration is set low. Alternatively, if the capacitor C2 is selected by the switch SW, a detected pulse signal having a waveform indicated by C2 in FIG. 5 is inputted to the base of the switching transistor Q2. In this case, the detection sensitivity is set very high.

Unnecessary detection of erroneous pulse signals may be cut or avoided by selecting proper characteristics of the filter.

By selecting the parameter value of the capacitor, where a child shakes the car with mischief or strong wind shakes the car, the detector will not sense this action. Only when the car is swung slowly will the detector sense the slant. That is, the repetition rate of output pulses from coupler 6 is proportional to the swing speed of plate 2. As the swing speed increases, the repetition rate (frequency) of output pulses increases and thus the output pulses applied to the base of transistor Q2 will be attenuated more. Since the transistor Q2 will be turned-on only in response to those output pulses having peaks greater than the threshold value of Q2, Q2 will not be turned on by output pulses relating to high speed vibration having peaks less than the threshold voltage and thus such high speed vibration or swing is not sensed. Thus, the lowpass filter will cut out or eliminate those output pulses relating to high speed or swing.

As described above with respect to FIG. 4, the detection sensitivity is changed by selecting either one of capacitors C1 or C2 through switch SW. When the larger capacitor C1 is selected, the attenuation of the output pulses of the lowpass filter T1 is larger as shown in FIG. 5. That is the sensitivity is lower when the larger capacitor C1 is selected.

The collector output of the switching transistor Q2 is applied to a shaping circuit (not shown) to output a waveform-shaped sensor signal therefrom.

Another embodiment of the detection sensitivity adjustment circuit is shown in FIG. 6 wherein the time constant of a filter T2 is successively changed by a rheostat VR.

By successively changing the time constant of the filter T2 using the rheostat VR, arbitrary frequency characteristics can be given to a detection pulse of the vibration detector A, and hence an arbitrary detection sensitivity can be set.

According to the detection sensitivity changeover circuit of the vibration detector of this invention, the detection sensitivity can be set as desired in accordance with the vibration mode of an automobile. The detection sensitivity can be set as desired merely by changing the time constant of the filter, thus realizing a detection sensitivity changeover circuit simple in construction and inexpensive.

What is claimed is:

1. A vibration detector comprising a frame;
   a fan-shaped plate pivotably mounted with respect to said frame, the plate including a plurality of slits aligned along the peripheral edge thereof;
   a photo-coupler including a light-emitting element and light-sensitive element, the two elements being arranged so that the slits are positioned between them where said light-sensitive element produces detection pulses in response to movement of the slits between the two elements due to vibration of said frame; and
   a detection sensitivity changeover circuit connected to said photo-coupler, the changeover circuit including a filter and means for adjusting the time constant of the filter to reduce detection of erroneous detection pulses.

2. A vibration detector according to claim 1, wherein said fan-shaped plate includes a weight which is disposed as a projection therefrom.

3. A vibration detector according to claim 2, wherein said frame includes two guide members for restricting the swing extent of said fan-shaped plate.

4. A vibration detector according to claim 3, wherein said guide members stop the swing of said fan-shaped plate by striking within the weight.

* * * * *